United States Patent [19]

Blank et al.

[11] Patent Number: 4,520,167

[45] Date of Patent: May 28, 1985

[54] HYDROXYALKYL CARBAMATE DILUENT FOR COATING COMPOSITIONS AND COMPOSITIONS CONTAINING THE SAME

[75] Inventors: Werner J. Blank, Wilton; Girish G. Parekh, Fairfield, both of Conn.

[73] Assignee: American Cyanamid Co., Stamford, Conn.

[21] Appl. No.: 581,007

[22] Filed: Feb. 17, 1984

[51] Int. Cl.³ .............................................. C08L 75/00
[52] U.S. Cl. .................... 525/131; 524/199; 524/200; 525/123; 525/162; 525/163; 525/424; 525/440; 525/443; 525/510
[58] Field of Search .............. 525/162, 163, 443, 510, 525/131, 440, 424; 524/199, 200

[56] References Cited

U.S. PATENT DOCUMENTS 3,557,043  1/1971  Krauss et al. ..................... 525/162
3,931,086  1/1976  Lindemann ........................ 525/162

Primary Examiner—Theodore E. Pertilla

[57] ABSTRACT

A coating composition comprises an hydroxyalkyl carbamate compound, an amino cross-linker, a polymer containing active sites which are reactive with the cross-linker and, optionally, an acid catalyst. The hydroxyalkyl carbamate compound serves as a reactive diluent in the composition. The composition is stable at ambient temperature and reactive at elevated temperature to form a cross-linked compound in which the hydroxyalkyl carbamate compound is incorporated.

14 Claims, No Drawings

HYDROXYALKYL CARBAMATE DILUENT FOR COATING COMPOSITIONS AND COMPOSITIONS CONTAINING THE SAME

BACKGROUND OF THE INVENTION

The present invention concerns a reactive diluent for a coating composition, and coating compositions including the same. The reactive diluent of the present invention comprises an hydroxyalkyl carbamate compound, as described in more detail below.

The reaction of propylene carbonate with primary and secondary amines to produce corresponding 2-hydroxypropyl carbamates is known in the art (Comp. rend, 1142, 1954). Similar reactions of ethylene carbonate are exemplified by the article, "The Preparation of Polymeric and Cyclic Urethans and Ureas from Ethylene Carbonate and Amines" by Elizabeth Dyer and Harvey Scott, J.A.C.S. (1956) pp. 672–675. See also the report "Polyurethane elastomers obtained without the use of diisocyanates" by L. Ya. Rappoport, G. N. Petrov, I. I. Trostyanskaya and O. P. Gavrilova in International Polymer Science and Technology, 8, No. 1, 1981. The Dyer-Scott reference discloses that polyurethanes might be prepared from 2-(hydroxyethyl) carbamate by elimination of ethylene glycol, thereby avoiding the need for using diisocyanates. The Rappoport et al paper discloses generally the reaction of cyclic carbonates with amines to form polyurethane elastomers. Thus, the prior art shows an awareness that amines react with, e.g., propylene carbonate, to yield the corresponding hydroxyalkyl carbamates. The Journal of Polymer Science, Vol. 7, 899 916 (1969), in an article entitled "New Method for Preparing Saturated and Unsaturated Aliphatic Polyurethanes" by Y. Mizake, S. Ozaki and Y. Hirata, at pages 899–915, discloses alternate routes to saturated and unsaturated polyurethanes, including polycondensation reaction of glycol bis (chloroformate) with diamine.

An article by Richard D. Cowell entitled: "Thermoplastic Polyurethane Elastomers: Chemistry Properties and Processing for the 80's" in the Journal of Elastomers and Plastics, Vol. 14, (October, 1982) pages 195–203, discloses the preparation of bis(2-hydroxyethyl)carbamates by reaction of diamines with ethylene carbonate followed by a catalyzed transesterification reaction with a glycol or macroglycol.

Coating compositions comprising a cross-linker and a backbone polymer containing sites thereon which are reactive with the cross-linker at elevated temperature to form a cross-linked polymeric material, but which are stable relative to each other at ambient temperatures are of course well known in the art. One difficulty with such compositions is that the high viscosity and high softening temperature of backbone polymers typically employed requires the utilization of a solvent to reduce viscosity of the polymer. After application of the coating composition and heating it to cure, volatilization of the solvent produces environmental, health and processing problems.

In order to achieve high solids content coating compositions, it is known to use high boiling point diols or polyols as reactive diluents in the compositions. However, in acid-catalyzed paint or coating formulations containing amino cross-linkers, the presence of diols or polyols reduces the shelf life of the coating formulation because the hydroxy groups on the polymer react with the amino cross-linkers.

SUMMARY OF THE INVENTION

The present invention provides a reactive diluent useful in coating compositions and which is obtained by reacting a cyclic carbonate and a primary amine to provide an hydroxylated carbamate compound. The present invention provides compositions which contain one or more hydroxyalkyl carbamate compounds as a reactive diluent and which provide longer shelf life and higher solids content than do prior compositions. The compositions of the present invention are well suited for use as coating or paint compositions or the like. Upon heating to an elevated temperature, the reactive diluent reacts with the polymer active sites to form pendant groups thereon and therefore is not driven off during heating.

In accordance with the present invention there is provided a coating composition comprising (a) an hydroxyalkyl carbamate compound of the formula (2), (3), (4), or (5) as described in the following detailed description of preferred embodiments of the invention; (b) an amino cross-linker; (c) a polymer containing active sites which are reactive (at elevated temperature) with the amino cross-linker (b); and (d) optionally, an acid catalyst; the compound (a), the cross-linker (b) and the polymer (c) being stable relative to each other in the composition while at ambient temperature, and reactive at elevated temperature.

In accordance with one aspect of the invention, the amino cross-linker (b) is selected from the class consisting of one or more of urea-formaldehyde, melamine-formaldehyde, glycoluril-formaldehyde and benzoguanamine-formaldehyde resins which have been at least partially alkylated and at least partially methyloylated.

In accordance with another aspect of the invention, the polymer (c) is selected from the class consisting of acrylic, polyester, alkyd and epoxy ester resins. In a related aspect of the invention the polymer (c) is a resin containing functional groups selected from the class consisting of one or more of —OH, —COOH, —CONH$_2$, and —OCONH$_2$. The functional groups may comprise from about 0.3 to about 25% by weight of the weight of the polymer (c) solids.

In another aspect of the invention the catalyst (d) is selected from the class consisting of one or more of blocked or unblocked acids; as used herein and in the claims, the term "acids" includes any suitable catalyst meeting the definition of either a Lewis acid or Bronsted acid.

One aspect of the invention provides for a reactive diluent for a coating composition comprising an hydroxyalkyl carbamate compound of the formula (2), (3), (4), or (5) as described in the following detailed description of preferred embodiments of the invention.

In accordance with one aspect of the invention there is provided a method of forming a coating on a substrate comprising applying to the substrate a coating composition comprising; an hydroxyalkyl carbamate compound of the formula (a), (b), (c) and, optionally, (d) as described above, and heating the applied composition at an elevated temperature and for a time sufficient to cure it; for example, heating the applied composition at a temperature of from about 200° to about 400° F. (about 93° to 204° C.).

DETAILED DESCRIPTION OF THE PREFERRED EMBODIMENTS

The compositions of the present invention comprise three essential and one optional component which may be present in a composition which has good shelf life at ambient temperature and which may be applied to a workpiece or substrate by conventional techniques such as brush, spray, roller or dipping applications. The applied coating is then heated to an elevated temperature for a time sufficient to cure it by a cross-linking reaction between components of the composition.

As mentioned above, the essential components of the coating composition are (a) an hydroxyalkyl carbamate compound, (b) an amino cross-linker and (c) a polymer containing active sites which are reactive with the amino cross-linker. The optional component is (d) an acid catalyst.

The Hydroxyalkyl Carbamate Compound

Cyclic carbonates such as ethylene or propylene carbonate react with amines to form hydroxyalkyl carbamates, according to the following typical example, in which $R_a$ is assumed to be hydrogen:

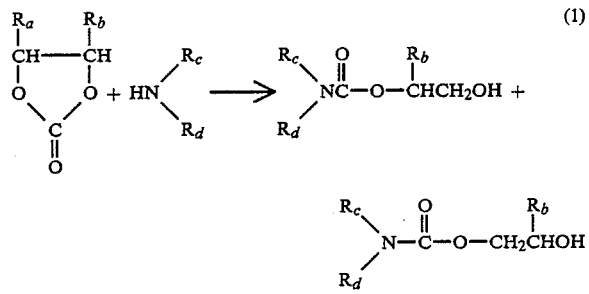  (1)

where $R_b$ is hydrogen for ethylene carbonate and methyl for propylene carbonate. The reaction may be run with or without solvent and, if so desired, protic solvents such as water or alcohols may be used. When either $R_c$ or $R_d$ is hydrogen, as in an unhindered primary amine, the reaction takes place at room or slightly elevated temperatures whereas secondary or hindered primary amines usually require heating and/or the use of catalysts for significant reaction.

The compounds useful as a component of the present invention are hydroxyalkyl carbamate compounds as may be obtained by reaction of a cyclic carbonate with a primary amine to obtain a compound of the formula

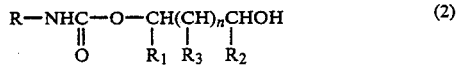  (2)

wherein R is a $C_1$ to $C_{20}$ organic moiety which may contain one or more heteroatoms and/or one or more hydroxyl groups and each of $R_1$, $R_2$, and $R_3$ is independently H or $CH_3$. A compound of the type exemplified in equation (2) is obtained by reacting a six-member ring cyclic carbonate with a primary amine.

The amines utilized in accordance with the present invention to react with one or more cyclic carbonates to provide hydroxyalkyl carbamate-containing compounds may be any one of a large number of compounds and, generally, may comprise primary amines containing straight chain or blanched alkyl, cycloalkyl or alkyl aromatic moieties, most preferably $C_1$ to $C_{20}$ alkyl, cycloalkyl, hydroxyalkyl or alkyl aromatic moieties and such moieties containing, in addition to at least one carbon atom, one or more heteroatoms. Such moieties containing one or more heteroatoms include, for example, those containing ether groups, thio groups and organosilicon moieties.

Generally, the cyclic carbonates which are to be reacted with the amines may comprise any suitable cyclic carbonate which is reactive with the primary amine group of an amine. Generally, five-member ring organic carbonates are preferred as compared to six-member ring organic carbonates because the latter are relatively more expensive and difficult to prepare. Accordingly, a preferred cyclic carbonate utilizable in the present invention has the formula given for the first member in equation (1) above, and wherein $R_a$ and $R_b$ may be the same or different, and each may comprise H, or $CH_3$. Ethylene carbonate and propylene carbonate are readily commercially available and are preferred reactants. When such five-member ring cyclic carbonates are one of the reactants, the resultant hydroxyalkyl carbamate compound will have the formula shown in (2) above with $n=o$ and, accordingly, a suitable class of hydroxyalkyl carbamate compounds in accordance with the present invention has the formula

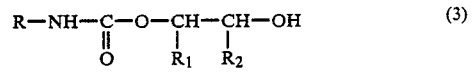  (3)

Other suitable classes of hydroxyalkyl carbamate compounds utilizeable as reactive diluents in accordance with the present invention are

  (4)

where R is a $C_2$ to $C_{20}$ aliphatic, cycloaliphatic or aromatic moiety, including any one of the foregoing containing heteroatoms, and $R_1$ is H or $CH_3$; and

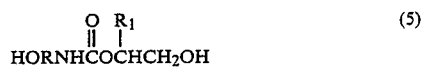  (5)

where R is a $C_2$ to $C_6$ alkyl and $R_1$ is H or $CH_3$.

Suitable reactive diluents which have been prepared and utilized in coating compositions in accordance with the invention include the following:

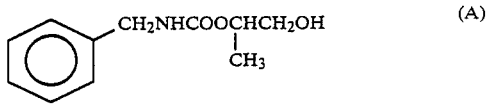  (A)

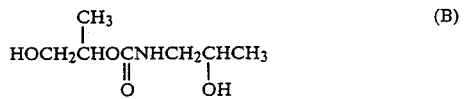  (B)

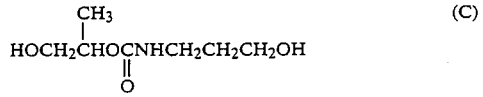  (C)

-continued $$C_{10}H_{21}O(CH_2)_3NHCOOCHCH_2OH \atop CH_3 \qquad (D)$$

The compounds of formulas (A)–(D) were prepared by reacting suitable amines (the formulas of which are readily discernible from the above) with an appropriate cyclic carbonate.

The Amino Cross-Linker

The amino cross-linker may be any one of a large variety of known amino cross-linking compounds including cross-linkers based on melamine, glycoluril, guanamines such as benzoguanamine, urea, substituted ureas and the like. As used herein and in the claims, the term "amino cross-linker" is intended to include any suitable aminoplast. One such suitable class of materials is aminoplast resinous compositions, in particular, modified aminoplast resinous compositions such as those disclosed in U.S. Pat. No. 3,082,180, comprising modified amino-triazine-aldehyde resins. Another suitable class of amino cross-linkers useable as a component of the invention comprises fully methylated, fully methylolated melamine compositions, a process for the manufacture of which is described in U.S. Pat. No. 4,293,692. Another suitable group of amino cross-linkers is that described in U.S. Pat. No. 4,105,708 and comprising substantially fully mixed-alkylated, substantially fully methylolated glycoluril derivatives comprising dimethoxymethyl diethoxymethyl glycoluril. Glycoluril is also known as acetylene urea and is obtained by reacting two moles of urea with one of glyoxal. Its proper chemical name is tetrahydroimidazo-(4,5-d)imidazole 2,5(1H,3H)-dione. The disclosures of the aforesaid U.S. Pat. Nos. 3,082,180, 4,293,692 and 4,105,708 are each incorporated by reference herein.

Particularly suitable classes of amino cross-linkers for use in the present invention are melamine-formaldehyde resins and glycoluril-formaldehyde resins which, in each case, have been partially or fully, i.e., at least partially, alkylated and methylolated. For example, as disclosed in the aforesaid U.S. Pat. No. 4,293,692, melamine may be methylolated by reaction with formaldehyde. The melamine may be either fully methylolated to produce hexamethylol melamine, or partially methylolated to produce pentamethylol melamine, tetramethylol melamine, etc., or mixtures of two or more of the foregoing. The at least partially methylolated melamine (or glycoluril) may then be reacted with an alcohol, such as methanol, to fully or partially alkylate the fully or partially methylolated melamine or glycoluril. For example, a substantially fully methylolated, fully alkylated melamine (hexamethoxymethylmelamine) is sold under the trademark CYMEL 303 by American Cyanamid Company. Reference herein and in the claims to "melamine-formaldehyde" and "glycoluril-formaldehyde" resins includes any suitable melamine and any suitable glycoluril derived resin utilizeable as a cross-linker in coating compositions. Similarly, reference herein and in the claims to "urea-formaldehyde" and "benzoguanamine-formaldehyde" resins includes corresponding urea and benzoguanamine derived resins.

The Polymer Containing Active Sites

Any one of a large variety of polymers containing active sites which are reactive at elevated temperature with the amino cross-linker and/or hydroxyalkyl carbamate groups is useable in the present invention. It will be appreciated that a broad spectrum of such compositions exists and can be selected to provide desired qualities in the cured coating. The following classes of such polymers are illustrative of those useable in the invention.

Any suitable acrylic resin may be utilized, i.e., any resin containing at least one acrylic moiety. Generally, acrylic resins comprise interpolymers of esters of unsaturated carboxylic acids, carboxylic acids and one or more ethylenically unsaturated monomers. The acid may be acrylic, methacrylic or other ethylenically unsaturated mono- or dicarboxylic acids. Alkyl acrylates, alkylmethacrylates and vinyl aromatic hydrocarbons such as styrene, vinyl toluene and the like may be employed as the monomer moeity of the interpolymer. By way of illustration, suitable acrylic resins could comprise interpolymers containing one or more of hydroxyethyl acrylate, maleic anhydride, n-methyloylacrylamide, hydroxypropyl acrylate, acrylamide, acrylic acid, methacrylic acid, methyl acrylamidoglycolate, methyl acrylamidoglycolate methyl ether, etc. The polymeric structure may also include modifying units derived from one or more of butadiene, styrene, alpha-methyl styrene, methyl methacrylate, butyl acrylate, acrylonitrile, hydroxyethyl acrylate, glycidyl methacrylate, acrylamide, methacrylamide, vinyl chloride and vinylidene chloride. For example, commercially available acrylic emulsion polymers obtained by polymerizing a monomer blend of n-butyl acrylate, styrene and acrylic acid may be utilized.

Any suitable polyester resin may likewise be utilized as the polymer of the compositions of the invention. Generally, such polymers comprise the reaction product of one or more glycols and dicarboxylic acids. By way of illustration, the polyester resin may be prepared by reacting together glycols such as ethylene glycol, diethylene glycol, triethylene glycol, trimethylene glycol, 1,2-propylene glycol, tetramethylene glycol, 2,3-butylene glycol, pentamethylene glycol, and dicarboxylic acids such as malonic maleic, succinic, adipic, pimelic, sebacic, oxalic, phthalic, terephthalic, hexahydroterephthalic, and pare-phenylene-diacetic acids, decamethylene dicarboxylic acid, and the like. Esterification reaction of the multifunctional alcohols and acids results in formation of the polyester. Modified resins such as polyester amide resins having terminal hydroxyl groups may also be utilized. Alkyd resins are similiarly formed by reaction of polybasic acids, anhydrides and polyhydric alcohols, for example, by reaction of isophthalic acid, succinic, maleic or pyromellitic anhydride and ethylene or propylene glycol or pentaerythritol.

Any one of a large number of epoxy ester resins may be employed as the polymer in the coating composition of the invention. For example, polyglycidyl esters of polycarboxylic acids, such as the reaction products of epichlorohydrin or other similar epoxy compounds with aliphatic or aromatic polycarboxylic acids such as cyanuric acid, terephthalic acid, glucaric acid, succinic acid, adipic acid, phthalic acid, oxalic acid, dimerized linolenic acid, phenols such as bisphenol-A, bisphenol-F, bisphenol-S, polyphenolic resins derived from phenol-formaldehyde-acetone condensates, etc. and the like may also be employed.

The Acid Catalyst

The acid catalyst optionally employed in the composition of the invention to reduce the cure temperature, may comprise any suitable acid, as mentioned above. Generally, any substance meeting the definition of a Lewis or Bronsted acid and which does not interfere with the cross-linking reaction or unduly adversely affect ambient temperature stability of the composition may be used. Among suitable acid catalysts are aromatic sulfonic acid compounds such as those disclosed in U.S. Pat. No. 3,960,688, alkyl esters of phosphoric or alkyl phosphonic acids, dinonyl naphthalene sulfonic acid, paratoluene sulfonic acid, n-dodecylbenzenesulfonic acid and the like, as well as inorganic acids such as nitric, sulfuric, phosphoric and hydrohalic acids.

The efficacy of compositions of the present invention is illustrated by the following Examples in Tables I–III, in which Example 1 is a comparative example showing an efficacious coating composition but one which does not include a reactive diluent and Examples 2–5 show coating compositions in accordance with the present invention.

Yet another aspect of the invention provides that the abovedescribed components of the compositions be present in the weight proportions of from about 1 to about 50, preferably from about 5 to about 30, parts of the hydroxyalkyl carbamate compound (a); from about 5 to about 50, preferably from about 10 to about 30, parts of the cross-linker (b); from about 40 to about 94, preferably from about 60 to about 85, parts of the polymer (c); and, when present, from about 0.1 to about 10, preferably from about 0.2 to about 5, parts of the catalyst (d). The weight proportions are based on the weight of resin solids for the resinous components.

TABLE I

The coating compositions of the Examples comprise a formulation prepared by blending the following components and diluting the blend with Cellosolve acetate to Ford Cup #4 viscosity of 41–43 seconds.

| Component | Parts by Weight |
| --- | --- |
| Acrylic Resin (75% solids)[1] | 66.6 |
| Hexamethoxymethylmelamine[2] | 35 |
| Reactive Diluent[3] | 15 |
| PTSA catalyst[4] | 1.0 |
| n-Butanol | 15 |

[1] A commercially available acrylic resin sold under the trademark ACRYLOID AT-400.
[2] A commercially available cross-linker sold by American Cyanamid Company under the trademark CYMEL 303.
[3] See line (1) of Table II, below.
[4] A commercially available 40% solution of PTSA in isopropanol 1% based on TRS, sold by American Cyanamid Company under the trademark CYCAT 4040-A. (PTSA = paratoluene sulfonic acid).

TABLE II

| Formulation Compositions and Characteristics | | | | | |
| --- | --- | --- | --- | --- | --- |
| Example | 1 | 2 | 3 | 4 | 5 |
| (1) Reactive Diluent of formula (*): | None | (A) | (B) | (C) | (D) |
| (2) Viscosity, FC 4, sec. | 43 | 43 | 41 | 42 | 40 |
| (3) NV %, 45° C./45 min. | 62.1 | 68.2 | 64.7 | 64.8 | 67.2 |
| (4) NV %, 125° C./20 min. | 56.7 | 60.6 | 56.1 | 56.4 | 60.2 |
| (5) % Wt. Retention | 91 | 89 | 87 | 87 | 89.5 |
| (6) % NV Advantage Over Control | — | 3.9 | 0 | 0 | 3.5 |
| (7) Stability at 50° C. (Viscosity, FC 4, after 4 days) | 300 | 130 | 107 | 150 | 101 |

(*) The reactive diluents of formulas (A)–(D) above were used in, respectively, the compositions of Examples 2, 3, 4 and 5. In lines (3), (4), and (6) NV = Non-Volatiles.

The above formulations were applied to a zinc phosphated cold rolled steel substrate and heated to cure at a temperature of 125° C. for twenty minutes.

The film coatings obtained from the compositions of the Examples displayed the properties set out in Table III.

TABLE III

| | Film Properties | | | | |
| --- | --- | --- | --- | --- | --- |
| Example | 1 | 2 | 6 | 7 | 9 |
| Film Thickness (mils) | 1.45 | 2 | 1.1 | 1.1 | 1.0 |
| Knoop Hardness | 10.9 | 13.6 | 14.8 | 15.6 | 9.0 |
| Pencil Hardness | F-H | F-H | 2–3H | 2–3H | F-H |
| Adhesion | 5 | 5 | 4–5 | 4–5 | 5 |
| Impact Resistance (in-lbs) (Rev) | 10 | <10 | <10 | <10 | <10 |

The above results show that utilization of the reactive diluent of the invention provides compositions of higher solids content as compared to compositions without the reactive diluent. The higher solids compositions have better stability and good film properties. As the reactive diluents of the coating compositions of the invention become part of the cured film, they of course are relatively non-volatile under the heating conditions used to cure the films, as compared to solvents which otherwise would have to be used to reduce viscosity in many compositions. The coating compositions of the invention are generally useable as coating compositions and are particularly useful in industrial finishes, laminating resin compositions, and adhesives.

Generally, reference herein and in the claims to hydroxyalkyl carbamate compounds, including structural formulas of the same, is intended to include the various isomeric species thereof, if any.

While the invention has been described with respect to specific preferred embodiments, it will be apparent to one skilled in the art that numerous variations may be made to the embodiments without departing from the spirit and scope of the invention.

What is claimed is:

1. A coating composition comprising:
    (a) a hydroxyalkyl carbamate compound of the formula

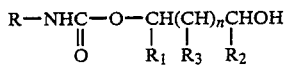

wherein n=0 or 1, R is a $C_1$ to $C_{20}$ organic moiety which may contain one or more constituents selected from the class consisting of hetero-atoms and hydroxyl groups, and each of $R_1$, $R_2$ and $R_3$ is independently H or $CH_3$;
    (b) an amide-aldehyde cross-linker; and
    (c) a polymer containing active sites which, at elevated temperatures are reactive with the amide-aldehyde cross-linker (b);

the compound (a), the cross-linker (b) and the polymer (c) being stable relative to each other in the composition while at ambient temperature, and reactive at elevated temperature.

2. The coating composition of claim 1 wherein the components (a)–(c) thereof are present in weight proportions, based on the weight of resin solids for the resinous components, of from about 1 to about 50 parts of the hydroxyalkyl carbamate compound (a); from about 5 to about 50 parts of the cross-linker (b); and from about 40 to about 94 parts of the polymer (c).

3. The coating composition of claim 1 wherein the components (a)–(c) thereof are present in weight proportions, based on the weight of resin solids for the resinous components, of from about 5 to about 30 parts of the hydroxyalkyl carbamate compound (a); from about 10 to about 30 parts of the cross-linker (b); and from about 60 to about 85 parts of the polymer (c).

4. The composition of claim 1 wherein the formula of compound (a), n=0 whereby the hydroxyalkyl carbamate compound has the formula

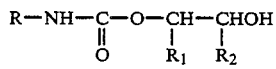

5. The composition of claim 1 wherein the compound (a) has the formula selected from the class consisting of

where R is a $C_2$ to a $C_{20}$ aliphatic, cycloaliphatic or aromatic moiety, including any one of the foregoing containing heteroatoms, and $R_1$ is H or $CH_3$; and

where R is a $C_2$ to $C_6$ alkyl and $R_1$ is H or $CH_3$.

6. The composition of claim 1 wherein the amide-aldehyde cross-linker (b) is selected from the class consisting of one or more of melamine formaldehyde and glycoluril-formaldehyde resins which have been at least partially alkylated and at least partially methylolated.

7. The composition of claim 1 wherein the polymer (c) is selected from the class consisting of acrylic, polyester, alkyd and epoxy ester resins.

8. The composition of claim 1 wherein the polymer (c) is a resin containing functional groups selected from the class consisting of one or more of —OH, —COOH, —CONH$_2$, and —OCONH$_2$.

9. The composition of claim 8 wherein the functional groups comprise from about 0.3 to about 25% by weight of the weight of the polymer (c) solids.

10. The composition of claim 1 comprising an acid catalyst.

11. The composition of claim 10 wherein the acid catalyst is selected from the class consisting of one or more of blocked or unblocked Lewis acids and Bronsted acids.

12. The composition of claim 2 comprising from about 0.1 to about 10 parts of an acid catalyst.

13. The composition of claim 3 comprising from about 0.2 to about 5 parts of an acid catalyst.

14. The coating composition of claim 1 wherein the amide-aldehyde cross-linker is selected from the group consisting of:
(i) aminotriazine-aldehyde resins;
(ii) melamine-formaldehyde resins;
(iii) glycoluril-formaldehyde resins;
(iv) urea-formaldehyde resins; and
(v) benzoguanamine-formaldehyde resins.

* * * * *